(12) United States Patent
Fang et al.

(10) Patent No.: US 12,278,554 B2
(45) Date of Patent: Apr. 15, 2025

(54) HARMONIC SUPPRESSION APPARATUS, METHOD, CONTROL UNIT, ELECTRICAL APPLIANCE, AND STORAGE MEDIUM

(71) Applicant: Gree Electric Appliances, Inc. of Zhuhai, Guangdong (CN)

(72) Inventors: Xiaobin Fang, Zhuhai (CN); Jialiang Zheng, Zhuhai (CN); Hongtao Yu, Zhuhai (CN); Xianyi Song, Zhuhai (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 102 days.

(21) Appl. No.: 18/269,378

(22) PCT Filed: Oct. 22, 2021

(86) PCT No.: PCT/CN2021/125639
§ 371 (c)(1),
(2) Date: Jun. 23, 2023

(87) PCT Pub. No.: WO2022/179141
PCT Pub. Date: Sep. 1, 2022

(65) Prior Publication Data
US 2024/0136911 A1    Apr. 25, 2024
US 2024/0235372 A9    Jul. 11, 2024

(30) Foreign Application Priority Data

Feb. 26, 2021    (CN) .......................... 202110217616.4

(51) Int. Cl.
*H02M 1/12* (2006.01)
*H02M 1/00* (2006.01)
(Continued)

(52) U.S. Cl.
CPC ......... *H02M 1/123* (2021.05); *H02M 1/0009* (2021.05); *H02M 1/4216* (2013.01); *H02M 7/53871* (2013.01)

(58) Field of Classification Search
CPC .. H02M 1/123; H02M 1/0009; H02M 1/4216; H02M 7/53871
See application file for complete search history.

(56) References Cited

U.S. PATENT DOCUMENTS 6,208,537 B1    3/2001 Skibinski et al.
8,853,957 B2 *  10/2014 Ge ....................... H02M 1/0064
                                            315/291

(Continued)

FOREIGN PATENT DOCUMENTS

CN    102882286 A    1/2013
CN    206524768 U    9/2017

(Continued)

OTHER PUBLICATIONS

EP 21927565, Extended European Search Report, Jun. 14, 2024.
(Continued)

*Primary Examiner* — Adolf D Berhane
(74) *Attorney, Agent, or Firm* — The Webb Law Firm

(57) ABSTRACT

The present disclosure provides a harmonic suppression apparatus, method, control unit, power supply apparatus, electric appliance equipment, and storage medium, wherein the harmonic suppression apparatus includes a tuning circuit module, which is connected with a first live wire and a second live wire of a three-phase power supply and is configured to perform resonance regulation processing; a PI-type resonant filtering circuit module, which is respectively connected with the tuning circuit module and a third live wire of the three-phase power supply and is configured to perform harmonic filtering processing on the first-phase current and the second-phase current processed by the (Continued)

tuning circuit module and a third-phase current; and a rectification circuit module, which is connected with the PI-type resonant filtering circuit module and is configured to perform rectification progressing and power a load.

18 Claims, 4 Drawing Sheets

(51) Int. Cl.
    *H02M 1/42*            (2007.01)
    *H02M 7/5387*        (2007.01)

(56) References Cited

U.S. PATENT DOCUMENTS

| | | |
|---|---|---|
| 9,837,924 B1 | 12/2017 | Wei et al. |
| 11,973,412 B2 * | 4/2024 | Suzuki ................. H02M 7/219 |
| 2011/0080102 A1 | 4/2011 | Ge et al. |
| 2024/0186908 A1 * | 6/2024 | Pan ........................ H02M 3/01 |

FOREIGN PATENT DOCUMENTS

| | | |
|---|---|---|
| CN | 107294407 A | 10/2017 |
| CN | 108288911 A | 7/2018 |
| CN | 104638952 B | 8/2018 |
| CN | 108847668 A | 11/2018 |
| CN | 110336458 A | 10/2019 |
| CN | 110752760 A | 2/2020 |
| CN | 112821401 A | 5/2021 |
| CN | 214314575 U | 9/2021 |
| EP | 0684679 A1 | 11/1995 |
| KR | 930000225 Y1 | 1/1993 |

OTHER PUBLICATIONS

Referex, May 20, 2024, XP040426033.
CN 202110217616.4, First Office Action and Search Report, Dec. 23, 2024.

* cited by examiner

HARMONIC SUPPRESSION APPARATUS, METHOD, CONTROL UNIT, ELECTRICAL APPLIANCE, AND STORAGE MEDIUM

CROSS-REFERENCE TO RELATED APPLICATIONS

This application is the United States national phase of International Application No. PCT/CN2021/125639 filed Oct. 22, 2021, and claims priority to Chinese Patent Application No. 202110217616.4 filed Feb. 26, 2021, the disclosures of which are hereby incorporated by reference in their entireties.

BACKGROUND OF THE INVENTION

Field of the Invention

This disclosure relates to the technical field of motors, and in particular, to a harmonic suppression apparatus, method, control unit, power supply apparatus, electric appliance equipment, and storage medium.

Description of Related Art

The European Norm EN 61000-3-2 requires that each phase input current of a three-phase power supply air conditioning device ≤16A, and forces that each harmonic of each phase input current meets a requirement of THD<5%. In a conventional design, by adopting an active power factor correction circuit (APFC), a requirement of 2nd to 40th harmonics is achieved. As shown in FIG. 1, the circuit is a related, typical three-phase APFC circuit, where a PWM controllable rectification solution is formed using an IPM module, a reactor, an alternating current input voltage, a current sampling and regulating circuit, and a DSP control circuit.

SUMMARY OF THE INVENTION

According to a first aspect of the present disclosure, there is provided a harmonic suppression apparatus, comprising: a tuning circuit module, which is connected with a first live wire and a second live wire of a three-phase power supply and is configured to perform resonance regulation processing on a first-phase current inputted through the first live wire and a second-phase current inputted through the second live wire; a PI-type resonant filtering circuit module, which is respectively connected with the tuning circuit module and a third live wire of the three-phase power supply and is configured to perform harmonic filtering processing on the first-phase current and the second-phase current processed by the tuning circuit module and a third-phase current inputted through a third live wire; and a rectification circuit module, which is connected with the PI-type resonant filtering circuit module and is configured to perform rectification progressing on the first-phase current, the second-phase current and the third-phase current processed by the PI-type resonant filtering circuit module, to obtain a direct current and output the direct current through a direct current output bus for powering a load.

In some embodiments, the tuning circuit module comprises: a power-on soft start unit, a detection unit and a control unit; the power-on soft start unit is connected with the first live wire and the second live wire; the detection unit acquires a voltage signal and a current signal on the direct current output bus; and the control unit is respectively connected with the power-on soft start unit and the detection unit and is configured to control the power-on soft start unit according to the voltage signal and the current signal to perform resonance regulation processing.

In some embodiments, the power-on soft start unit comprises: a first relay, a second relay, a third relay and a resistance-inductance unit; the first relay has an input end connected with the first live wire and an output end connected with the PI-type resonant filtering circuit module; the second live wire is connected with an input end of the second relay, and the second live wire is connected with an input end of the third relay through the resistance-inductance unit; the second relay has an output end connected with an output end of the third relay, the connection point being connected with the PI-type resonant filtering circuit module; and the control unit is respectively connected with control ends of the first relay, the second relay and the third relay and is configured to control the first relay, the second relay and the third relay to be switched off or on.

In some embodiments, the detection unit comprises: a current sampling circuit and a voltage sampling circuit; the control unit is respectively connected with the current sampling circuit and the voltage sampling circuit; the current sampling circuit is used for acquiring the current signal on the direct current output bus; and the voltage sampling circuit is used for acquiring the voltage signal on the direct current output bus.

In some embodiments, the PI-type resonant filtering circuit module comprises: a first reactor, a second reactor, a third reactor, a common mode choke, a first capacitor, a second capacitor, a third capacitor, a fourth capacitor, a fifth capacitor, a sixth capacitor, a seventh capacitor, an eighth capacitor and a ninth capacitor; the first reactor has an input end connected with the third live wire and an output end connected with a first input end of the common mode choke through a first connection wire; the second reactor has an input end connected with an output end of the first relay and an output end connected with a second input end of the common mold choke through a second connection wire; the third reactor has an input end connected with the connection point between the output end of the second relay and the output end of the third relay, and an output end connected with a third input end of the common mold choke through a third connection wire; the first capacitor has two ends respectively connected with the first connection wire and the second connection wire, the second capacitor has two ends respectively connected with the first connection wire and the third connection wire, and the third capacitor has two ends respectively connected with the second connection wire and the third connection wire; first ends of the fourth capacitor, the fifth capacitor and the sixth capacitor are connected, and second ends of the fourth capacitor, the fifth capacitor and the sixth capacitor are respectively connected with the first connection wire, the second connection wire and the third connection wire; a fourth connection wire between a first output end of the common mold choke and the rectification circuit module is connected with a first end of the seventh capacitor, a fifth connection wire between a second output end of the common mold choke and the rectification circuit module is connected with a first end of the eighth capacitor, and a sixth connection wire between a third output end of the common mold choke and the rectification circuit module is connected with a first end of the ninth capacitor; and second ends of the seventh capacitor, the eighth capacitor and the ninth capacitor are connected, and the connection point is grounded.

In some embodiments, the rectification circuit module comprises: a three-phase rectifier bridge and a capacitor assembly; the three-phase rectifier bridge has three bridge arms respectively connected with the fourth connection wire, the fifth connection wire and the sixth connection wire; the three-phase rectifier bridge has a first output end connected with a positive end of the direct current output bus, and a second output end connected with a negative end of the direct current output bus; and the capacitor assembly is connected in parallel with the first output end and the second output end of the three-phase rectifier bridge.

In some embodiments, the capacitor assembly comprises: a tenth capacitor, an eleventh capacitor, a twelfth capacitor and a thirteenth capacitor; the tenth capacitor and the twelfth capacitor are connected in series to form a first capacitor circuit, which has two ends respectively connected with the first output end and the second output end of the three-phase rectifier bridge; the eleventh capacitor and the thirteenth capacitor are connected in series to form a second capacitor circuit, which has two ends respectively connected with the first output end and the second output end of the three-phase rectifier bridge, wherein a connection wire between the tenth capacitor and the twelfth capacitor is connected with a connection wire between the eleventh capacitor and the thirteenth capacitor.

According to a second aspect of the present disclosure, there is provided a harmonic suppression method based on the harmonic suppression apparatus as described above, which is executed in a control unit, wherein the load comprises a load motor, and the harmonic suppression method comprises: calculating a load frequency and a harmonic suppression current according to the voltage signal and the current signal on the direct current output bus and a parameter of the load motor; and performing harmonic suppression processing based on the load frequency and the harmonic suppression current.

In some embodiments, the harmonic suppression current comprises: a first shaft current; the performing harmonic suppression processing based on the load frequency and the harmonic suppression current comprises: acquiring an operating frequency of the load motor and a second shaft current; performing first comparison processing between the operating frequency and the load frequency, and determining a third shaft current according to a result of the first comparison processing; and performing second comparison processing between a result of performing sum on the third shaft current and the first shaft current, and the second shaft current, and determining a shaft voltage of the load motor according to a result of the second comparison processing.

In some embodiments, the determining a third shaft current according to a result of the first comparison processing comprises: calculating the third shaft current according to the result of the first comparison processing and by using a first PI control algorithm; and the determining a shaft voltage of the load motor according to a result of the second comparison processing comprises: calculating the shaft voltage of the load motor according to the result of the second comparison processing and by using a second PI control algorithm.

In some embodiments, the first shaft current, the second shaft current and the third shaft current comprise: a q-axis current; and the shaft voltage of the load motor comprises: a q-axis voltage.

In some embodiments, the load frequency is calculated by:

$$\omega' = \sum_{n=0}^{f(n)} U(n)I(n)/1.5p(k_t i_q + (L_d - L_q)i_d i_q);$$

and the first shaft current is calculated by:

$$i'_q = \sum_{n=0}^{f(n)} U(n)I(n)/1.5p(k_t + (L_d - L_q)i_d)\omega;$$

where n is sampling times, I(n) is an nth sampling current, U(n) is an nth sampling voltage, p is the number of pole pairs of the load motor, $k_t$ is a torque coefficient, $L_d$ and $i_d$ are d-axis inductance and current, and $L_q$ and $i_q$ are q-axis inductance and current, and ω is the operating frequency of the load motor.

In some embodiments, the first relay, the second relay and the third relay are controlled to be switched off or on for resonance regulation, wherein under the condition that the operating frequency of the load motor is 0, the first relay, the second relay, and the third relay are controlled to be switched off.

According to a third aspect of the present disclosure, there is provided a control unit comprising: a memory; and a processor coupled to the memory, the processor being configured to perform, based on instructions stored in the memory, the method as described above.

According to a fourth aspect of the present disclosure, there is provided a computer-readable storage medium having thereon stored computer instructions which, when executed by a processor, implement the method as described above.

According to a fifth aspect of the present disclosure, there is provided a power supply apparatus, comprising: the harmonic suppression apparatus as described above.

According to a sixth aspect of the present disclosure, there is provided an electric appliance equipment, comprising: the harmonic suppression apparatus as described above.

In some embodiments, the electric appliance equipment comprises: an inverter air conditioner.

BRIEF DESCRIPTION OF THE DRAWINGS

In order to more clearly illustrate the embodiments of the present disclosure or technical solutions in the related art, the drawings that need to be used in the description of the embodiments or the related art will be briefly described below. It is obvious that the drawings in the description below are merely some embodiments of the present disclosure, and for one of ordinary skill in the art, other drawings can also be obtained according to these drawings without paying out creative efforts.

DESCRIPTION OF THE INVENTION

In order to make the technical problems to be solved by the present disclosure, technical solutions and advantageous effects more clearly understood, the present disclosure is further described in detail below with reference to the accompanying drawings and the embodiments. It should be understood that the specific embodiments described herein are merely used for explaining this disclosure, and are not intended to limit this disclosure.

Thus, one feature indicated in this description will serve to describe one of features of one embodiment of the present disclosure, rather than implying that every embodiment of the present disclosure must have the described feature. Furthermore, it should be noted that this description describes many features. Although certain features can be combined to show a possible system design, these features can also be used in other combinations not explicitly described. Thus, the described combinations are not intended to be limiting unless otherwise specified.

The principles and structures of the present disclosure are described in detail below with reference to the drawings and the embodiments.

The terms "first", "second", etc. hereinafter are only used for descriptive distinction and have no other special meanings.

The inventors of the present disclosure have found that the following problems exist in the related art described above: the PWM controllable rectification solution of the APFC circuit has a complex software design, great technical difficulty, and a high power factor, and the three-phase APFC circuit has a high cost and poor reliability. Therefore, how to design a harmonic suppression circuit with simple control and high reliability is a technical problem to be solved in the industry.

In view of this, the present disclosure provides a harmonic suppression apparatus, method, control unit, power supply apparatus, electric appliance equipment, and storage medium, which make each phase current of the three-phase power supply pass through a PI-type adjustable resonance point filtering circuit to enable real-time regulation of input voltage, current phase, matching impedance and multiple resonance points, thereby achieving three-phase power supply power factor correction and reactive power regulation, so that THD of harmonics of each phase current meets the requirement of the national standard, and standby power consumption meets the requirement of the standard; and which have simple control, low cost, and high reliability.

Figure 1:
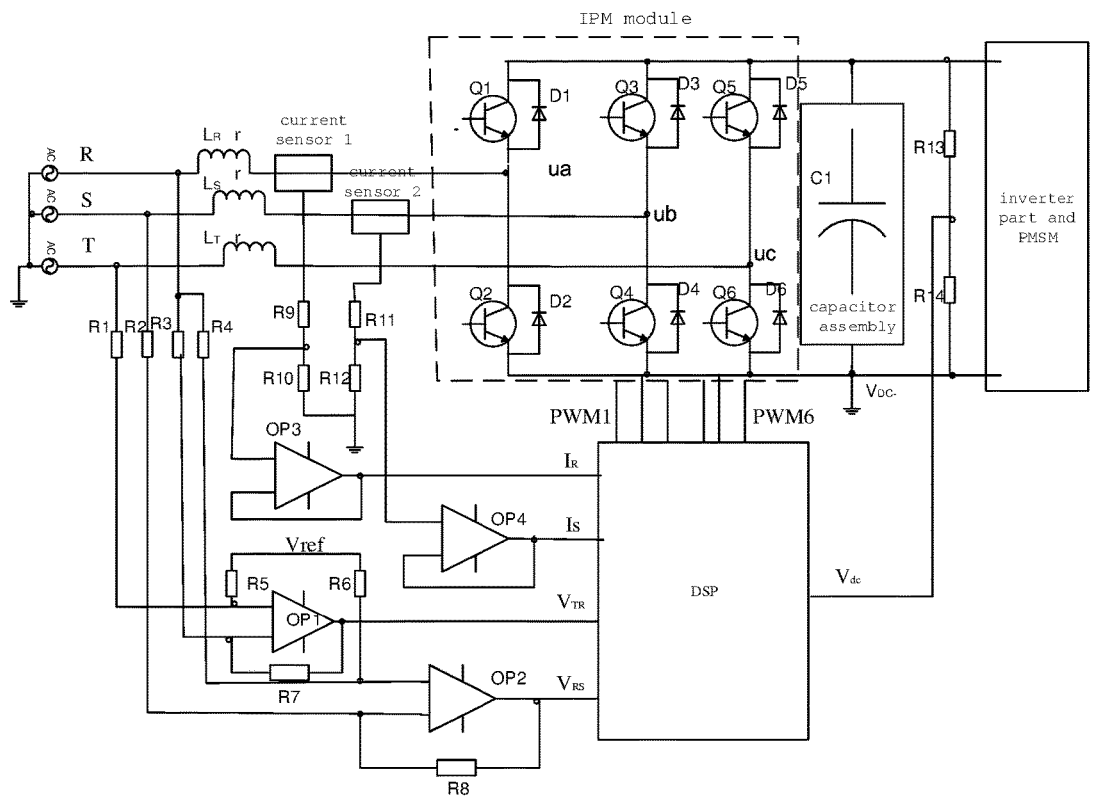
FIG. 1 is a schematic diagram of an APFC circuit in the related art.
Figure 2:
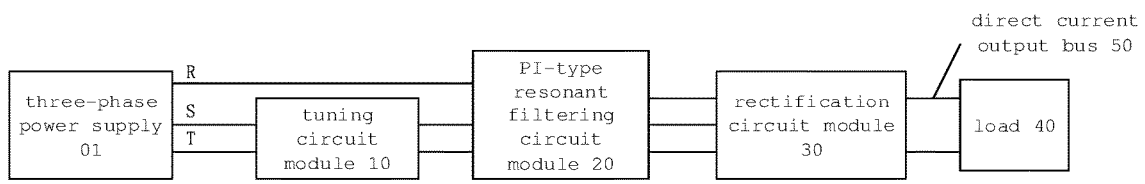
FIG. 2 is a schematic module diagram of some embodiments of a harmonic suppression apparatus according to the present disclosure.

In some embodiments, as shown in FIG. 2, the present disclosure provides a harmonic suppression apparatus, comprising a tuning circuit module 10, a PI-type resonant filtering circuit module 20, and a rectification circuit module 30. The tuning circuit module 10 is connected with a first live wire S and a second live wire T of a three-phase power supply 01, and performs resonance regulation processing on a first-phase current inputted through the first live wire S and a second-phase current inputted through the second live wire T.

The PI-type resonant filtering circuit module 20 is respectively connected with the tuning circuit module 10 and a third live wire R of the three-phase power supply 01, and performs harmonic filtering processing on the first-phase current and the second-phase current processed by the tuning circuit module 10 and a third-phase current inputted through the third live wire R. The rectification circuit module 30 is connected with the PI-type resonant filtering circuit module 20, and performs rectification processing on the first-phase current, the second-phase current, and the third-phase current processed by the PI-type resonant filtering circuit module 20, to obtain a direct current and output the direct current through a direct current output bus 50 for powering a load 40. The load 40 can be various, for example, the load 40 is an inverter part, an inverter motor of a compressor, and the like.

Figure 3:
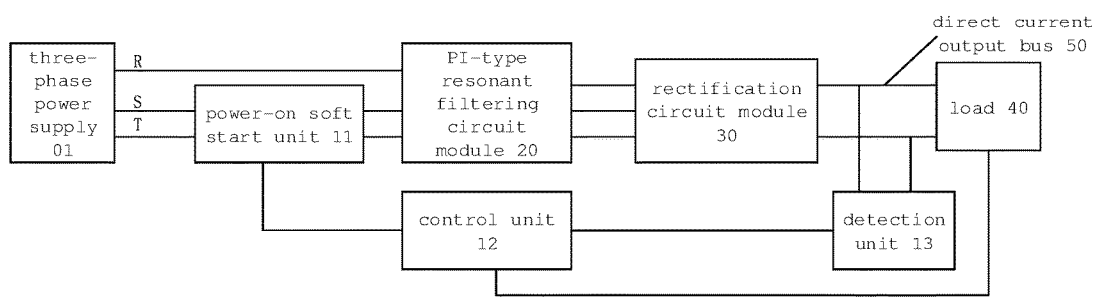
FIG. 3 is a schematic module diagram of other embodiments of a harmonic suppression apparatus according to the present disclosure.

In some embodiments, as shown in FIG. 3, the tuning circuit module comprises a power-on soft start unit 11, a detection unit 13, and a control unit 12. The power-on soft start unit 11 is connected with the first live wire S and the second live wire T; and the detection unit 13 acquires a voltage signal and a current signal on the direct current output bus 50. The control unit 12 is respectively connected with the power-on soft start unit 11 and the detection unit 13, and controls the power-on soft start unit 11 to perform resonance regulation processing according to the voltage signal and the current signal.

Figure 4:
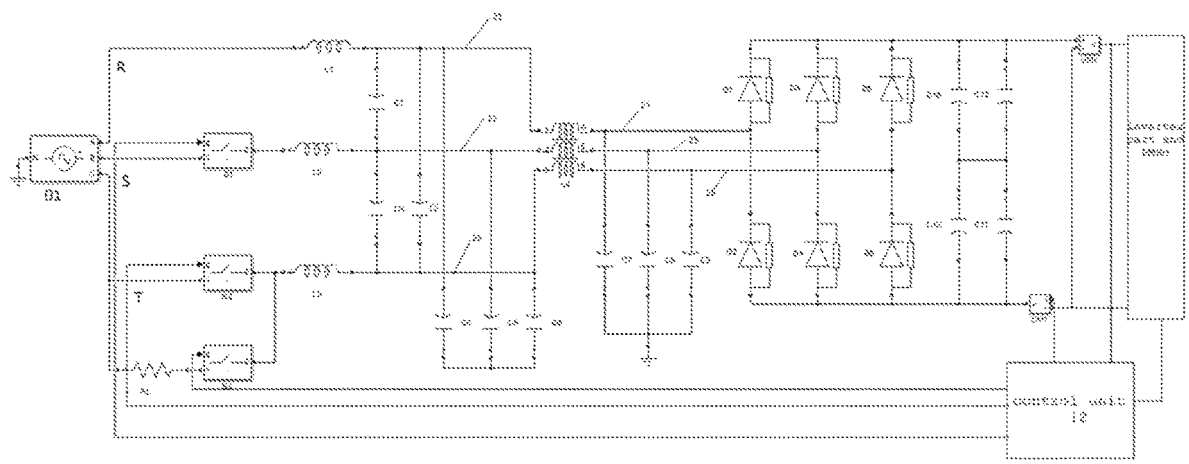
FIG. 4 is a schematic circuit diagram of some embodiments of a harmonic suppression apparatus according to the present disclosure.

In some embodiments, as shown in FIG. 4, the power-on soft start unit 11 comprises: a first relay S1, a second relay S2, a third relay S3, and a resistance-inductance unit RL. The first relay S1 has an input end connected with the first live wire S and an output end connected with the PI-type resonant filtering circuit module. The second live wire T is connected with an input end of the second relay S2, and the second live wire T is connected with an input end of the third relay S3 through the resistance-inductance unit RL, wherein the resistance-inductance unit RL can be various and has characteristics of resistance and inductance. An output end of the second relay S2 is connected with an output end of the third relay S3, the connection point being connected with the PI-type resonant filtering circuit module.

The control unit 12 is respectively connected with control ends of the first relay S1, the second relay S2 and the third relay S3, and is configured to control the first relay S1, the second relay S2 and the third relay S3 to be switched off or on. The control unit 12 can be implemented in various ways, such as a digital signal processing (DSP) module, a single chip microcomputer, etc.

The detection unit comprises a current sampling circuit CM1 and a voltage sampling circuit VM1. The current sampling circuit CM1 and the voltage sampling circuit VM1 can be implemented in various ways, for example, the current sampling circuit CM1 includes a current sensor or the like, and the voltage sampling circuit VM1 includes a voltage sensor or the like. The control unit 12 is respectively connected with the current sampling circuit CM1 and the voltage sampling circuit VM1, the current sampling circuit CM1 acquiring the current signal on the direct current output bus, the voltage sampling circuit VM1 acquiring the voltage signal on the direct current output bus.

By regulating the resistance-inductance module RL, an amplitude and phase of the current can be controlled, and the control unit 12 can adjust switching frequencies of the three relays S1, S2 and S3 according to a change in the load. Under the condition that the control unit 12 controls the first relay S1 to be switched on, the second relay S2 to be switched off, and the third relay S3 to be switched on, the three-phase power supply and the resistance-inductance module RL form a closed loop so that standby energy is consumed on the RL, which can make power consumption less than 15 W.

The two live wires S, T of the three-phase power supply are respectively connected in series with the power-on soft start unit 11 (reactive power tuning soft start circuit), the power-on soft start unit 11 is composed of the resistance-inductance module RL and the three relays S1, S2 and S3, the control ends g of the three relays S1, S2 and S3 are respectively connected with the control unit 12, and B, C ends of the three-phase power supply are respectively connected with the PI-type resonant filtering circuit module (inductors L2 and L3), thereby achieving reactive power regulation control of the LC resonance point, standby power consumption of less than 15 W, and the power-on soft start function.

In some embodiments, the PI-type resonant filtering circuit module can be various, for example, as shown in FIG. 4, the PI-type resonant filtering circuit module comprises a first reactor L1, a second reactor L2, a third reactor L3, a common mode choke L4, a first capacitor C1, a second capacitor C2, a third capacitor C3, a fourth capacitor C4, a fifth capacitor C5, a sixth capacitor C6, a seventh capacitor C7, an eighth capacitor C8, and a ninth capacitor C9.

The first reactor L1 has an input end connected with the third live wire R and an output end connected with a first input end 1 of the common mode choke L4 through a first connection wire 21; the second reactor L2 has an input end connected with the output end of the first relay S1 and an output end connected with a second input end 2 of the common mode choke L4 through a second connection wire 22; the third reactor L3 has an input end connected with the connection point between the output end of the second relay S2 and the output end of the third relay S3, and an output end connected with a third input end 3 of the common mode choke L4 through a third connection wire 23.

Two ends of the first capacitor C1 are respectively connected with the first connection wire 21 and the second connection wire 22, two ends of the second capacitor C2 are respectively connected with the first connection wire 21 and the third connection wire 23, and two ends of the third capacitor C3 are respectively connected with the second connection wire 22 and the third connection wire 23. First ends of the fourth capacitor C4, the fifth capacitor C5 and the sixth capacitor C6 are connected, and second ends of the fourth capacitor C4, the fifth capacitor C5 and the sixth capacitor C6 are respectively connected with the first connection wire 21, the second connection wire 22 and the third connection wire 23.

A fourth connection wire 24 between a first output end 4 of the common mode choke L4 and the rectification circuit module is connected with a first end of the seventh capacitor C7, a fifth connection wire 25 between a second output end 5 of the common mode choke L4 and the rectification circuit module is connected with a first end of the eighth capacitor C8, and a sixth connection wire 26 between a third output end 6 of the common mode choke L4 and the rectification circuit module is connected with a first end of the ninth capacitor C9; second ends of the seventh capacitor C7, the eighth capacitor C8 and the ninth capacitor C9 are connected, and this connection point is grounded.

A live wire R of the three-phase power supply, the first relay S1, and the connection point between the second relay S2 and the third relay S3 are directly connected in series with the PI-type resonant filtering circuit module, which is composed of the three reactors L1\L2\L3, the common mode choke L4, the capacitors C1\C2\C3, C4\C5\C6 and C7\C8\C9. The three reactors L1\L2\L3 can be same reactors, and capacitance values of the capacitors C1\C2\C3, C4\C5\C6 and C7\C8\C9 can all be equal. The PI-type resonant filtering circuit module can achieve PI-type resonance, impedance matching, and three-phase power supply power factor correction. The PI-type resonant filtering circuit filters out a power grid interference source, and its LC generates resonance to present an impedance state, so that 2th to 40th harmonic interference is filtered out, and THD (Total Harmonic Distortion) of 2th to 40th harmonics of each phase current <5%, which meets the requirement of the national standard.

In some embodiments, the rectification circuit module can be various. For example, as shown in FIG. 4, the rectification circuit module comprises a three-phase rectifier bridge and a capacitor assembly; the three-phase rectifier bridge has three bridge arms respectively connected with the fourth connection wire 24, the fifth connection wire 25 and the sixth connection wire 26; the three-phase rectifier bridge has a first output end connected with a positive end of the direct current output bus and a second output end connected with a negative end of the direct current output bus; and the capacitor assembly is connected in parallel with the first output end and the second output end of the three-phase rectifier bridge.

The capacitor assembly comprises a tenth capacitor C10, an eleventh capacitor C11, a twelfth capacitor C12 and a thirteenth capacitor C13; the tenth capacitor C10 and the twelfth capacitor C12 are connected in series to form a first capacitor circuit, which has two ends respectively connected with the first output end and the second output end of the three-phase rectifier bridge; the eleventh capacitor C11 and the thirteenth capacitor C13 are connected in series to form a second capacitor circuit, which has two ends respectively connected with the first output end and the second output end of the three-phase rectifier bridge, wherein a connection wire between the tenth capacitor C10 and the twelfth capacitor C12 is connected with a connection wire between the eleventh capacitor C11 and the thirteenth capacitor C12.

The three-phase rectifier bridge can be various, for example, six diodes D1\D2\D3\D4\D5\D6 form a three-phase uncontrollable rectifier bridge, and the capacitors C10\C11\C12\C13 form the capacitor assembly, so that filtering and shaping is performed to meet the operation of the load. The three-phase rectifier bridge (composed of diodes D1\D2\D3\D4\D5\D6) and the capacitor assembly (composed of the capacitors C10\C11\C12\C13) convert an alternating current (AC) into a direct current (DC), thereby achieving energy conversion and transmission of a power factor correction circuit for use by the load.

The harmonic suppression apparatus in the above embodiment achieves three-phase power supply power factor correction and reactive power regulation, so that THD of 2th to 40th harmonic currents of each phase current <5%, which meets the requirement of the international harmonic standard, and can meet the standard requirement that standby power consumption is less than 15 W; and compared with the conventional APFC solution, achieves lower cost, simple control and high reliability.

Figure 5:
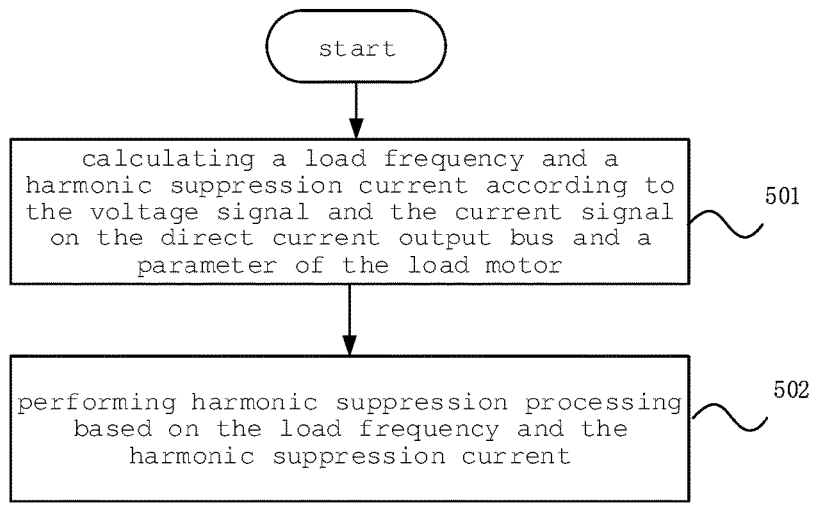
FIG. 5 is a schematic flow diagram of some embodiments of a harmonic suppression method according to the present disclosure.

In some embodiments, the present disclosure provides a harmonic suppression method based on the harmonic suppression apparatus in the above embodiment, which is executed in a control unit, wherein the load comprises a load motor. FIG. 5 is a schematic flow diagram of some embodiments of a harmonic suppression method according to the present disclosure, as shown in FIG. 5:

step 501, calculating a load frequency and a harmonic suppression current according to the voltage signal and the current signal on the direct current output bus and a parameter of the load motor.

In some embodiments, the control unit receives the voltage signal and the current signal on the direct current output bus, which are respectively acquired by the voltage sampling circuit and the current sampling circuit. The parameter of the load motor comprises the number of pole pairs of the motor, a torque coefficient, inductances and currents of a d-axis and a q-axis, an operating frequency of the motor, and the like.

Step 502, performing harmonic suppression processing based on the load frequency and the harmonic suppression current.

The harmonic suppression processing can have various processing methods. For example, by controlling the control ends g of the three relays, resonance points are regulated, and the power harmonic suppression current $i_q'$ is injected, thereby achieving related power compensation and achieving power factor correction and regulation, and so on.

In some embodiments, the harmonic suppression current comprises a first shaft current; and the operating frequency of the load motor and a second shaft current are acquired. The control unit, when the load motor operates, acquires the operating frequency of the load motor and the second shaft current, which can be acquired by adopting various relevant acquisition methods.

First comparison processing is performed between the operating frequency and the load frequency, and a third shaft current is determined according to a result of the first comparison processing. For example, the third shaft current is calculated according to the result of the first comparison processing and by using a first PI control algorithm. The first shaft current, the second shaft current, and the third shaft current can all be q-axis currents.

Second comparison processing is performed between a result of performing sum on the third shaft current and the first shaft current, and the second shaft current, and a shaft voltage of the load motor is determined according to a result of the second comparison processing. For example, the shaft voltage of the load motor is calculated according to the result of the second comparison processing and by using a second PI control algorithm. The shaft voltage of the load motor includes a q-axis voltage.

Figure 6:
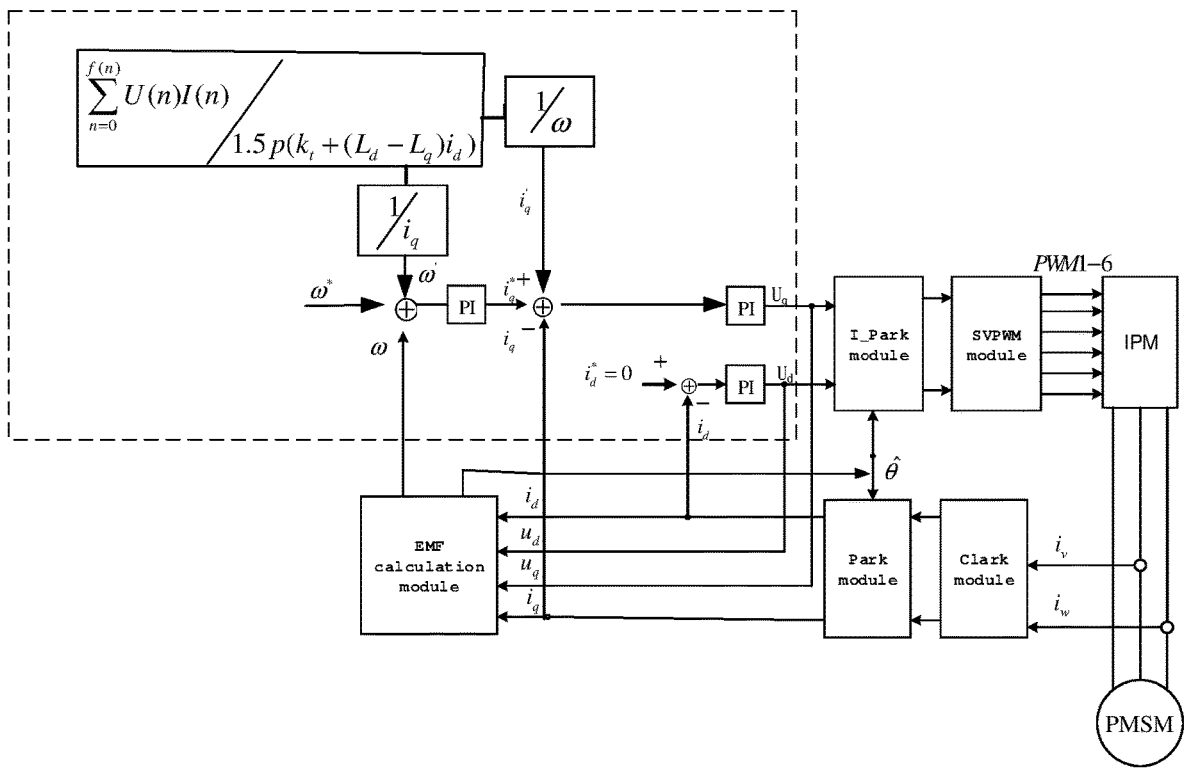
FIG. 6 is a schematic control principle diagram of some embodiments of a harmonic suppression method according to the present disclosure.

As shown in FIG. 6, the load motor is a permanent-magnet synchronous motor (PMSM), and a function inside a dashed box in FIG. 6 can be implemented by the control unit of the present disclosure, or the control unit can also implement one or more functions outside the dashed box in FIG. 6, for example, the control unit also comprises an EMF calculation module, etc. The load comprises a load motor control means, and other functions not implemented by the control unit can be implemented by the load motor control means.

The control unit of the present disclosure calculates instantaneous power by:

$$P1 = \sum_{n=0}^{f(n)} U(n)I(n)\cos\theta; \quad (1\text{-}1)$$

Based on the instantaneous power P1, the load frequency is calculated by:

$$\omega' = \sum_{n=0}^{f(n)} U(n)I(n)/1.5p(k_t i_q + (L_d - L_q)i_d i_q); \quad (1\text{-}2)$$

The first shaft current is calculated by:

$$i_q' = \sum_{n=0}^{f(n)} U(n)I(n)/1.5p(k_t + (L_d - L_q)i_d)\omega; \quad (1\text{-}3)$$

where n is sampling times, which can be obtained by a software counter; I(n) is an nth sampling current, which is acquired by the current sampling circuit; U(n) is an nth sampling voltage, which is acquired by the voltage sampling circuit; and cos θ is a power coefficient.

p is the number of pole pairs of the load motor, $k_t$ is the torque coefficient, $L_d$ and $i_d$ are the d-axis inductance and current, $L_q$ and $i_q$ are the q-axis inductance and current, and ω is the operating frequency of the load motor. $L_d$, $L_q$, $i_d$, $i_q$, are respectively the inductances and currents of the d-axis and the q-axis of the load motor. The parameters P, $k_t$, $L_d$, $L_q$ can be obtained by a motor specification of the load motor and stored in advance. $i_d$ and $i_q$ are the d-axis and q-axis currents acquired when the load motor operates, or $i_d$ and $i_q$ are obtained through the motor specification of the load motor and stored in advance. ω is the operating frequency of the motor, which is an actual operating frequency of the load motor that is acquired when the load motor operates.

As shown in FIG. 6, ω* is a predetermined frequency of the load motor, the first comparison processing can be performed using ω* or ω' and ω, and the third shaft current $i_q$ can be calculated according to the result of the first comparison processing and by using the first PI control algorithm. The first comparison processing is typically performed using ω' and ω. The second comparison processing is performed between the result of performing sum on the third shaft current $i_q$ and the first shaft current $i_q'$ and the second shaft current $i_q$, and the shaft voltage $u_q$ of the load motor is calculated according to the result of the second comparison processing and by using the second PI control algorithm. Third comparison processing is performed between a fourth shaft current $i_d$*=0 and a fifth shaft current $i_d$, and a shaft voltage $u_d$ of the load motor is calculated according to the result of the third comparison processing and by using a third PI control algorithm.

The first PI control algorithm, the second PI control algorithm, and the third PI control algorithm can be a correlated PI control algorithm including P (proportional) control and I (integral) control, which can be implemented in a software manner.

Through an I_Park module and an SVPWM (Space Vector Pulse Width Modulation) module, I_Park conversion and SVPWM processing are performed on $u_q$ and $u_d$ in sequence, and then the results are sent to an IPM (Intelligent Power Module) that controls the PMSM (Permanent-Magnet Synchronous Motor). $i_v$ and $i_w$ of the PMSM are acquired, and Clark processing and Park conversion processing are performed on the $i_v$ and $i_w$; and an EMF (counter electromotive force) calculation module calculates a ω value according to the $u_q$, $u_d$, $i_d$, $i_q$. The I_Park module, the SVPWM module, the Clark module, the Park module, the EMF calculation module, and the like can be implemented using related algorithms and methods to perform the corresponding functions.

In some embodiments, the first relay, the second relay, and the third relay are controlled to be switched off or on for resonance regulation. Under the condition that the operating frequency of the load motor is 0, the first relay, the second relay and the third relay are controlled to be switched off.

Figure 7:
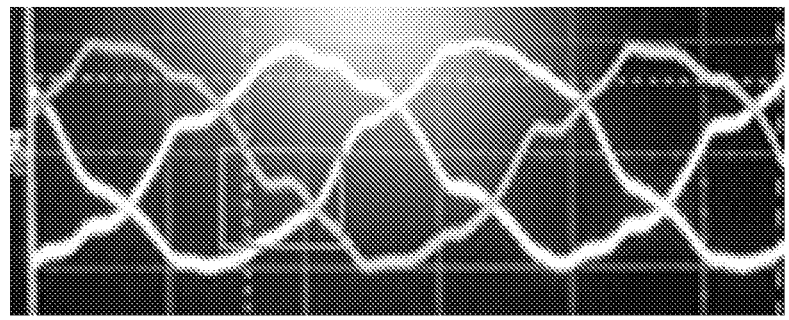
FIG. 7 is a schematic effect diagram of a harmonic suppression method according to the present disclosure.

The instantaneous power P1 is calculated, and the load frequency ω is calculated according to the instantaneous power P1; after the load frequency is stable, R and L values of the resistance-inductance module are regulated by controlling the control ends g of the second relay and the third relay to regulate the resonance point, so that the circuit resonates to present impedance. After the resonance point is regulated to be stable, the first shaft current $i_q'$ (harmonic suppression current) is calculated, and the current $i_q'$ is injected, namely the current is injected into the $i_q$ axis in a vector control graphic of the load motor, so that a conduction angle β of a rectifier bridge diode is reduced. The rectifier bridge diode can be a rectifier bridge diode of the inverter part, or the diode in the three-phase rectifier bridge of the rectification circuit module. The conduction angle β of the diode can be regulated by using a related method to enable a current waveform to follow an input voltage waveform of a power grid power supply to approach a sine wave, as shown in FIG. 7, which is a voltage waveform displayed on a screen of a device such as an oscilloscope.

The harmonic suppression apparatus and the harmonic suppression method in the above embodiments make each phase current of the three-phase power supply pass through the PI-type adjustable resonance point filtering circuit to enable real-time regulation of input voltage, current phase, matching impedance and multiple resonance points, thereby achieving three-phase power supply power factor correction and reactive power regulation, so that THD of 2th to 40th harmonics of each phase current <5%, which meets the requirement of the national standard, and meets the requirement of the standard that the standby power consumption is less than 15 W; and which has simple control, low cost, and high reliability.

Figure 8:
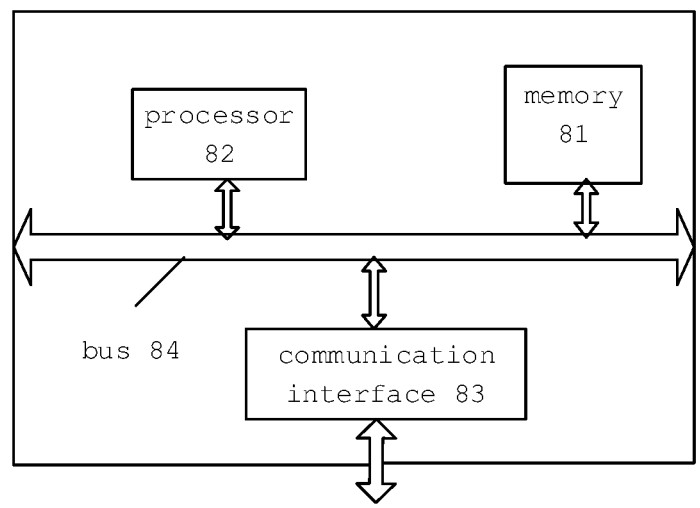
FIG. 8 is a schematic module diagram of some embodiments of a control unit according to the present disclosure.

In some embodiments, FIG. 8 is a schematic module diagram of some embodiments of a control unit according to the present disclosure. As shown in FIG. 8, the apparatus can comprise a memory 81, a processor 82, a communication interface 83, and a bus 84. The memory 81 is used for storing instructions, the processor 82 is coupled to the memory 81, and the processor 82 is configured to implement, based on the instructions stored in the memory 81, the harmonic suppression method in any of the above embodiments.

The memory 81 can be a high-speed RAM memory, a non-volatile memory, or the like, and the memory 81 can be a memory array. The memory 81 can also be partitioned into blocks, and the blocks can be combined into virtual volumes according to a certain rule. The processor 82 can be a central processing unit (CPU), or an application specific integrated circuit (ASIC), or one or more integrated circuits configured to implement the harmonic suppression method according to the present disclosure.

In some embodiments, the present disclosure provides a computer-readable storage medium having thereon stored computer instructions which, when executed by a processor, implement the harmonic suppression method in any of the above embodiments.

In some embodiments, the present disclosure provides a power supply apparatus comprising the harmonic suppression apparatus in the above embodiments. The power supply apparatus is a three-phase power supply apparatus or the like.

In some embodiments, the present disclosure provides an electric appliance equipment comprising the harmonic suppression apparatus in the above embodiments. The electric appliance equipment can be various, such as an inverter air conditioner.

The harmonic suppression apparatus, method, control unit, power supply apparatus, electric appliance equipment and storage medium provided by the above embodiments make each phase current of the three-phase power supply pass through the PI-type adjustable resonance point filtering circuit to enable real-time regulation of input voltage, current phase, matching impedance and multiple resonance points, thereby achieving three-phase power supply power factor correction and reactive power regulation, so that THD of 2th to 40th harmonics of each phase current <5%, which meets the requirement of the national standard, and meets the requirement of the standard that standby power consumption is less than 15 W; and which has simple control, low cost, and high reliability; the cost is reduced by at least 200 Yuan compared with the conventional APFC solution.

It should be appreciated by those skilled in the art, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more computer-available non-transitory storage media (including, but not limited to, a disk memory, CD-ROM, optical memory, etc.) having computer-available program code embodied therein.

The method and system of the present disclosure can be implemented in a number of ways. For example, the method and system of the present disclosure can be implemented by software, hardware, firmware, or any combination of software, hardware, and firmware. The above order for the steps of the method is for illustration only, and the steps of the method of the present disclosure are not limited to the order specifically described above unless specifically stated otherwise. Furthermore, in some embodiments, the present disclosure can also be implemented as programs recorded in a recording medium, the programs including machine-readable instructions for implementing the method according to the present disclosure. Thus, the present disclosure also covers the recording medium for storing the programs for executing the method according to the present disclosure.

The above description is only preferred embodiments of the present disclosure, and is not used for limiting this disclosure, and any modification, equivalent substitution, improvement, etc. made within the spirit and principle of the present disclosure should be included within the protection scope of this disclosure.

What is claimed is:

1. A harmonic suppression apparatus, comprising:
a tuning circuit module, which is connected with a first live wire and a second live wire of a three-phase power supply and is configured to perform resonance regulation processing on a first-phase current inputted through the first live wire and a second-phase current inputted through the second live wire;
a PI-type resonant filtering circuit module, which is respectively connected with the tuning circuit module and a third live wire of the three-phase power supply and is configured to perform harmonic filtering processing on the first-phase current and the second-phase current processed by the tuning circuit module and a third-phase current inputted through a third live wire; and
a rectification circuit module, which is connected with the PI-type resonant filtering circuit module and is configured to perform rectification progressing on the first-phase current, the second-phase current and the third-phase current processed by the PI-type resonant filtering circuit module, to obtain a direct current and output the direct current through a direct current output bus for powering a load.

2. The harmonic suppression apparatus according to claim 1, wherein the tuning circuit module comprises: a power-on soft start unit, a detection unit and a control unit;
the power-on soft start unit is connected with the first live wire and the second live wire; the detection unit acquires a voltage signal and a current signal on the direct current output bus; and
the control unit is respectively connected with the power-on soft start unit and the detection unit and is configured to control the power-on soft start unit according to the voltage signal and the current signal to perform resonance regulation processing.

3. The harmonic suppression apparatus according to claim 2, wherein the power-on soft start unit comprises: a first relay, a second relay, a third relay and a resistance-inductance unit;
the first relay has an input end connected with the first live wire and an output end connected with the PI-type resonant filtering circuit module;
the second live wire is connected with an input end of the second relay, and the second live wire is connected with an input end of the third relay through the resistance-inductance unit; the second relay has an output end connected with an output end of the third relay, the connection point being connected with the PI-type resonant filtering circuit module; and
the control unit is respectively connected with control ends of the first relay, the second relay and the third relay and is configured to control the first relay, the second relay and the third relay to be switched off or on.

4. The harmonic suppression apparatus according to claim 3, wherein the detection unit comprises: a current sampling circuit and a voltage sampling circuit; the control unit is respectively connected with the current sampling circuit and the voltage sampling circuit;
the current sampling circuit is used for acquiring the current signal on the direct current output bus; and the voltage sampling circuit is used for acquiring the voltage signal on the direct current output bus.

5. The harmonic suppression apparatus according to claim 3, wherein the PI-type resonant filtering circuit module comprises: a first reactor, a second reactor, a third reactor, a common mode choke, a first capacitor, a second capacitor, a third capacitor, a fourth capacitor, a fifth capacitor, a sixth capacitor, a seventh capacitor, an eighth capacitor and a ninth capacitor;
the first reactor has an input end connected with the third live wire and an output end connected with a first input end of the common mode choke through a first connection wire;
the second reactor has an input end connected with an output end of the first relay and an output end connected with a second input end of the common mold choke through a second connection wire; the third reactor has an input end connected with the connection point between the output end of the second relay and the output end of the third relay, and an output end connected with a third input end of the common mold choke through a third connection wire;
the first capacitor has two ends respectively connected with the first connection wire and the second connection wire, the second capacitor has two ends respectively connected with the first connection wire and the third connection wire, and the third capacitor has two ends respectively connected with the second connection wire and the third connection wire; first ends of the fourth capacitor, the fifth capacitor and the sixth capacitor are connected, and second ends of the fourth capacitor, the fifth capacitor and the sixth capacitor are respectively connected with the first connection wire, the second connection wire and the third connection wire;
a fourth connection wire between a first output end of the common mold choke and the rectification circuit module is connected with a first end of the seventh capacitor, a fifth connection wire between a second output end of the common mold choke and the rectification circuit module is connected with a first end of the eighth capacitor, and a sixth connection wire between a third output end of the common mold choke and the rectification circuit module is connected with a first end of the ninth capacitor; and second ends of the seventh capacitor, the eighth capacitor and the ninth capacitor are connected, and the connection point is grounded.

6. The harmonic suppression apparatus according to claim 5, wherein the rectification circuit module comprises: a three-phase rectifier bridge and a capacitor assembly;
the three-phase rectifier bridge has three bridge arms respectively connected with the fourth connection wire, the fifth connection wire and the sixth connection wire; the three-phase rectifier bridge has a first output end connected with a positive end of the direct current output bus, and a second output end connected with a negative end of the direct current output bus; and the capacitor assembly is connected in parallel with the first output end and the second output end of the three-phase rectifier bridge.

7. The harmonic suppression apparatus according to claim 6, wherein the capacitor assembly comprises: a tenth capacitor, an eleventh capacitor, a twelfth capacitor and a thirteenth capacitor;
the tenth capacitor and the twelfth capacitor are connected in series to form a first capacitor circuit, which has two ends respectively connected with the first output end and the second output end of the three-phase rectifier bridge; the eleventh capacitor and the thirteenth capacitor are connected in series to form a second capacitor circuit, which has two ends respectively connected with the first output end and the second output end of the three-phase rectifier bridge, wherein a connection wire between the tenth capacitor and the twelfth capacitor is connected with a connection wire between the eleventh capacitor and the thirteenth capacitor.

8. A harmonic suppression method based on the harmonic suppression apparatus according to claim 3, which is executed in a control unit, wherein the load comprises a load motor, and the harmonic suppression method comprises:

calculating a load frequency and a harmonic suppression current according to the voltage signal and the current signal on the direct current output bus and a parameter of the load motor; and performing harmonic suppression processing based on the load frequency and the harmonic suppression current.

9. The harmonic suppression method according to claim 8, wherein the harmonic suppression current comprises: a first shaft current; the performing harmonic suppression processing based on the load frequency and the harmonic suppression current comprises:

acquiring an operating frequency of the load motor and a second shaft current;

performing first comparison processing between the operating frequency and the load frequency, and determining a third shaft current according to a result of the first comparison processing; and performing second comparison processing between a result of performing sum on the third shaft current and the first shaft current, and the second shaft current, and determining a shaft voltage of the load motor according to a result of the second comparison processing.

10. The harmonic suppression method according to claim 9, wherein the determining a third shaft current according to a result of the first comparison processing comprises:

calculating the third shaft current according to the result of the first comparison processing and by using a first PI control algorithm; and the determining a shaft voltage of the load motor according to the result of the second comparison processing comprises:

calculating the shaft voltage of the load motor according to the result of the second comparison processing and by using a second PI control algorithm.

11. The harmonic suppression method according to claim 9, wherein the first shaft current, the second shaft current and the third shaft current comprise: a q-axis current; and the shaft voltage of the load motor comprises: a q-axis voltage.

12. The harmonic suppression method according to claim 11, comprising:

calculating the load frequency by:

$$\omega' = \sum_{n=0}^{f(n)} U(n)I(n)/1.5p(k_t i_q + (L_d - L_q)i_d i_q);$$

and calculating the first shaft current by:

$$i'_q = \sum_{n=0}^{f(n)} U(n)I(n)/1.5p(k_t + (L_d - L_q)i_d)\omega;$$

where n is sampling times, I(n) is an nth sampling current, U(n) is an nth sampling voltage, p is the number of pole pairs of the load motor, $k_t$ is a torque coefficient, $L_d$ and $i_d$ are d-axis inductance and current, and $L_q$ and $i_g$ are q-axis inductance and current, and $\omega$ is the operating frequency of the load motor.

13. The harmonic suppression method according to claim 8, further comprising:

controlling the first relay, the second relay and the third relay to be switched off or on for resonance regulation, wherein under the condition that the operating frequency of the load motor is 0, the first relay, the second relay, and the third relay are controlled to be switched off.

14. A control unit comprising:

a memory; and a processor coupled to the memory, the processor being configured to perform, based on instructions stored in the memory, the method according to claim 8.

15. A non-transient computer-readable storage medium having thereon stored computer instructions which, when executed by a processor, implement the method according to claim 8.

16. A power supply apparatus, comprising:

the harmonic suppression apparatus according to claim 1.

17. An electric appliance equipment, comprising:

the harmonic suppression apparatus according to claim 1.

18. The electric appliance equipment according to claim 17, wherein the electric appliance equipment comprises: an inverter air conditioner.

* * * * *